(12) United States Patent
Herpel

(10) Patent No.: US 9,937,965 B1
(45) Date of Patent: Apr. 10, 2018

(54) COLLAPSIBLE ROOF FAIRING

(71) Applicant: AIRODYNE INDUSTRIES, INC., Madison Heights, MI (US)

(72) Inventor: Celeste Herpel, Troy, MI (US)

(*) Notice: Subject to any disclaimer, the term of this patent is extended or adjusted under 35 U.S.C. 154(b) by 0 days.

(21) Appl. No.: 15/374,985

(22) Filed: Dec. 9, 2016

Related U.S. Application Data

(60) Provisional application No. 62/265,024, filed on Dec. 9, 2015.

(51) Int. Cl.
*B62D 35/00* (2006.01)
*B62D 33/08* (2006.01)
*B62D 27/06* (2006.01)

(52) U.S. Cl.
CPC ......... *B62D 35/001* (2013.01); *B62D 27/065* (2013.01); *B62D 33/08* (2013.01)

(58) Field of Classification Search
CPC .................................................. B62D 65/001
USPC ........................................... 296/180.2, 180.3
See application file for complete search history.

(56) References Cited

U.S. PATENT DOCUMENTS

| D249,783 | S | 10/1978 | Herpel | |
|---|---|---|---|---|
| 4,290,639 | A | 9/1981 | Herpel | |
| 4,749,220 | A * | 6/1988 | Adams | B62D 35/001 296/180.3 |
| 4,784,424 | A | 11/1988 | Wiley, Jr. | |
| 4,919,472 | A * | 4/1990 | Wiley, Jr. | B62D 35/001 296/180.2 |
| D314,163 | S | 1/1991 | Harris et al. | |
| 5,249,837 | A | 10/1993 | Luttrell | |
| D343,819 | S | 2/1994 | Meryman et al. | |
| 5,513,894 | A | 5/1996 | Ragsdale | |
| D374,418 | S | 10/1996 | Griffin | |
| D375,925 | S | 11/1996 | Griffin | |
| 5,603,549 | A | 2/1997 | Chen et al. | |
| D384,317 | S | 9/1997 | Jahnke | |
| 5,755,485 | A * | 5/1998 | Christie | B62D 35/001 296/180.1 |
| D424,489 | S | 5/2000 | Damon et al. | |
| D475,657 | S | 6/2003 | Wong et al. | |
| D482,303 | S | 11/2003 | Shea | |
| D535,597 | S | 1/2007 | Herpel | |
| 7,998,392 | B2 | 8/2011 | Eggink et al. | |
| 8,925,998 | B2 * | 1/2015 | Ramos | B62D 35/001 296/180.2 |
| 9,708,016 | B2 * | 7/2017 | Kim | B62D 35/001 |
| 2014/0084625 | A1 * | 3/2014 | Ramos | B62D 35/001 296/180.2 |

(Continued)

FOREIGN PATENT DOCUMENTS

DE 3213820 A1 10/1983

*Primary Examiner* — Jason S Morrow
(74) *Attorney, Agent, or Firm* — Young Basile Hanlon & MacFarlane, P.C.

(57) ABSTRACT

A collapsible vehicle roof fairing includes a channel bracket attachable to a roof of the vehicle, a lower fairing connected to the channel bracket, and an upper fairing removably connected to the lower fairing, the upper fairing selectively moveable between an operating position and a collapsed position. A front decking bracket is attached to the upper fairing, the front decking bracket connectable to the channel bracket when the upper fairing is arranged in the collapsed position, and detached from the channel bracket when the upper fairing is arranged in the operating position.

20 Claims, 15 Drawing Sheets

(56) References Cited

U.S. PATENT DOCUMENTS

2017/0120964 A1\* 5/2017 Kim .................... B62D 35/001

\* cited by examiner

US 9,937,965 B1

COLLAPSIBLE ROOF FAIRING

CROSS-REFERENCE TO RELATED APPLICATION

This application claims priority to U.S. Patent Application No. 62/265,024, filed Dec. 9, 2015, the entire disclosure of which is incorporated herein in its entirety by reference.

BACKGROUND

Fuel consumption is a significant operating cost for trucking and other forms of transportation. As fuel costs have risen, the expense of fuel has become an increasingly important component in the operating expenses associated with transportation. Trucks and other heavy land-based transport vehicles tend to have boxy shapes that are inefficient aerodynamically. When operating the vehicle at normal operating speeds, air flow resistance at the front of the vehicle tends to resist forward movement of the vehicle and decrease fuel economy.

Various solutions for reducing air flow resistance or drag at the front of a vehicle have been proposed, such as altering the aerodynamic shape of the vehicle to "streamline" the front of the vehicle. For example, roof fairings may employed on a variety of land vehicles, particularly truck tractors, for purposes of reducing drag.

BRIEF SUMMARY

Although efficient at reducing drag, the height of roof fairings may be a concern when multiple truck tractors are placed in a "piggy back" or "decked" arrangement for shipping from the factory. An example of several truck tractors decked for shipping is illustrated in FIG. 1. During decked shipping a towing truck tractor may tow one or more truck tractors. Each decked truck tractor may be secured to a fifth wheel of the truck tractor immediately in front of the decked vehicle.

While decking may be convenient for truck delivery, the stacking of the truck tractors may cause the roof fairings to extend above a particular height limit, such as, for example, a bridge height limit. Various multi-piece roof fairing configurations may overcome this problem. For example, a two-piece arrangement enables a height of the roof fairing to be lowered during shipment and then extended after delivery. During shipping, the two-piece construction enables an upper fairing body section to fit within a lower fairing body section to reduce an overall height of the roof fairing. After delivery, the upper fairing body section may be moved to an operating position in which the height of the roof fairing is extended. This process can be labor-intensive and require many components.

Described herein is a roof fairing that can be separated for shipment and extended for use. The roof fairing has a configuration that results in simple transition to the operating position.

One collapsible vehicle roof fairing described herein comprises a channel bracket attachable to a roof of the vehicle, a lower fairing connected to the channel bracket, an upper fairing removably connected to the lower fairing, the upper fairing selectively moveable between an operating position and a collapsed position, and a front decking bracket attached to the upper fairing, the front decking bracket connectable to the channel bracket when the upper fairing is arranged in the collapsed position, and detached from the channel bracket when the upper fairing is arranged in the operating position. A rear decking bracket may be attached to the upper fairing and to a cab extender support bracket.

BRIEF DESCRIPTION OF THE DRAWINGS

The description herein makes reference to the accompanying drawings wherein like reference numerals refer to like parts throughout the several views unless otherwise noted.

Figure 1:
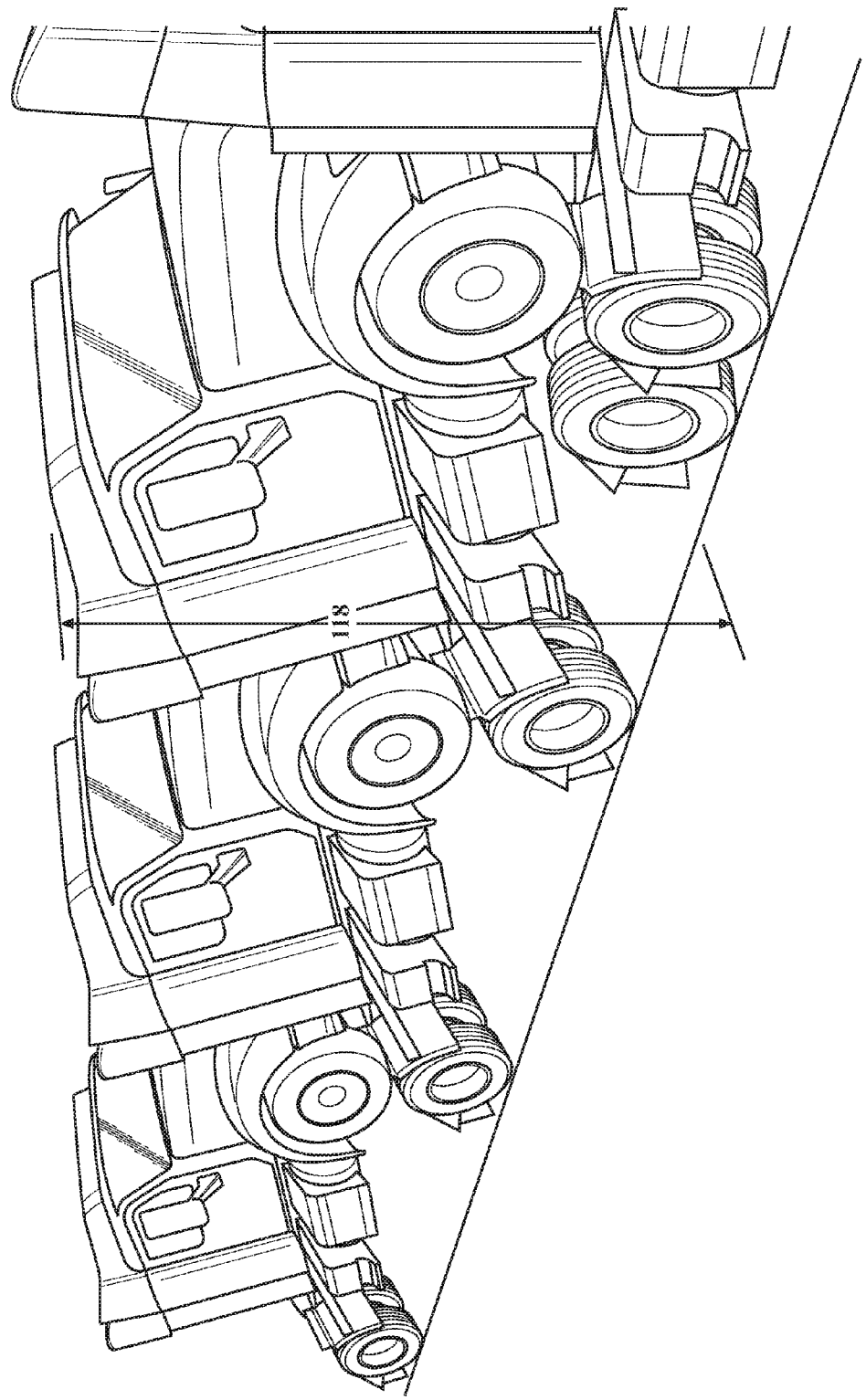
FIG. 1 illustrates multiple truck tractors arranged in a decked formation for delivery, with their respective roof fairings arranged in a collapsed position.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

DETAILED DESCRIPTION

Figure 2:
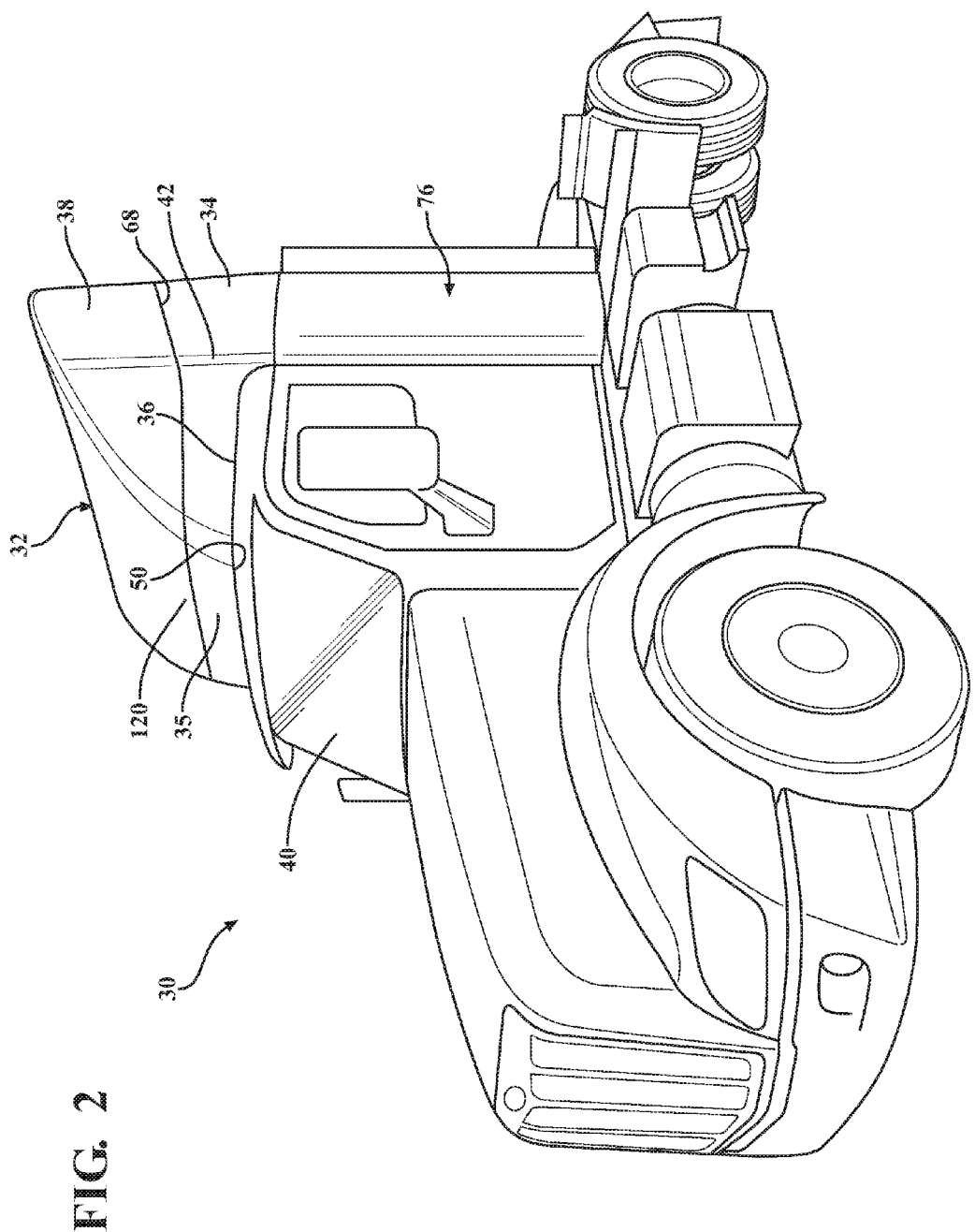
FIG. 2 is a front perspective view of a truck tractor employing an exemplary collapsible roof fairing, the roof fairing arranged in an operating position.
Figure 3:
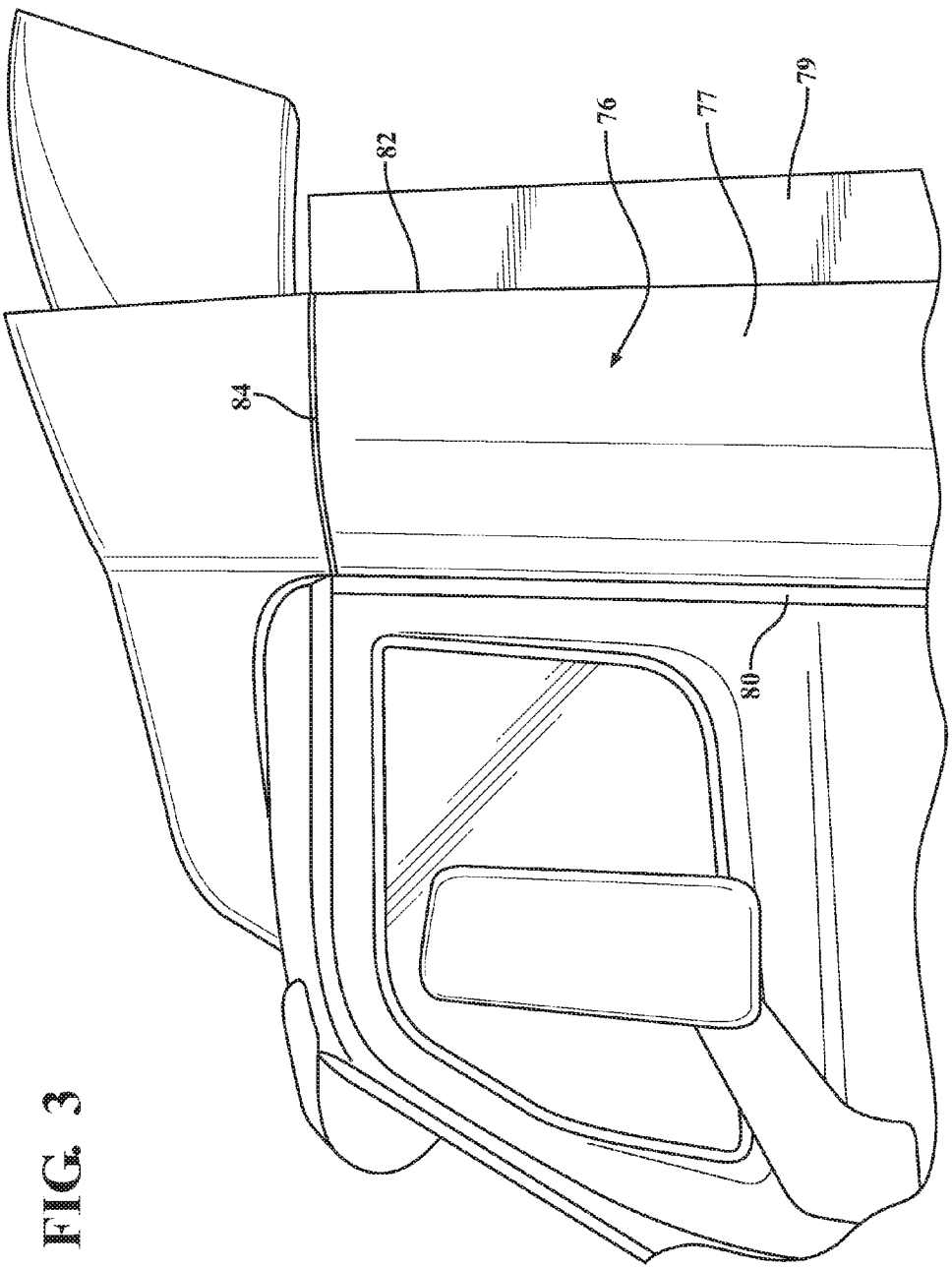
FIG. 3 is a side plan view of the roof fairing of FIG. 1 arranged in the collapsed position.

With reference to FIGS. 2 and 3, a truck tractor 30 includes a roof fairing 32 that gives the vehicle a more streamlined shape to reduce aerodynamic drag and improve fuel efficiency. Roof fairing 32 may be constructed from a variety of materials, including for example, metals such as aluminum and steel, polymers, composite materials such as carbon fiber reinforced epoxy, fiberglass reinforced polymers, as well as other materials.

Roof fairing 32 employs a detachable two-piece construction that enables roof fairing 32 to be selectively adjusted between an operating position, as shown for example in FIG. 2, and a collapsed position, as shown for example in FIG. 3. Roof fairing 32 includes a lower fairing 34 that attaches to a cab roof 36 of the truck tractor 30 and an upper fairing 38 that is mounted on top of lower fairing 34 when roof fairing 32 is arranged in the operating position. During shipping of truck tractor 30, upper fairing 38 may be detached from lower fairing 34 and nested within lower fairing 34 to decrease an overall height of roof fairing 32. After delivery, upper fairing 38 is repositioned to the operating position by reattaching upper fairing 38 to lower fairing 34, whereby a height of roof fairing 32 is extended.

Figure 4:
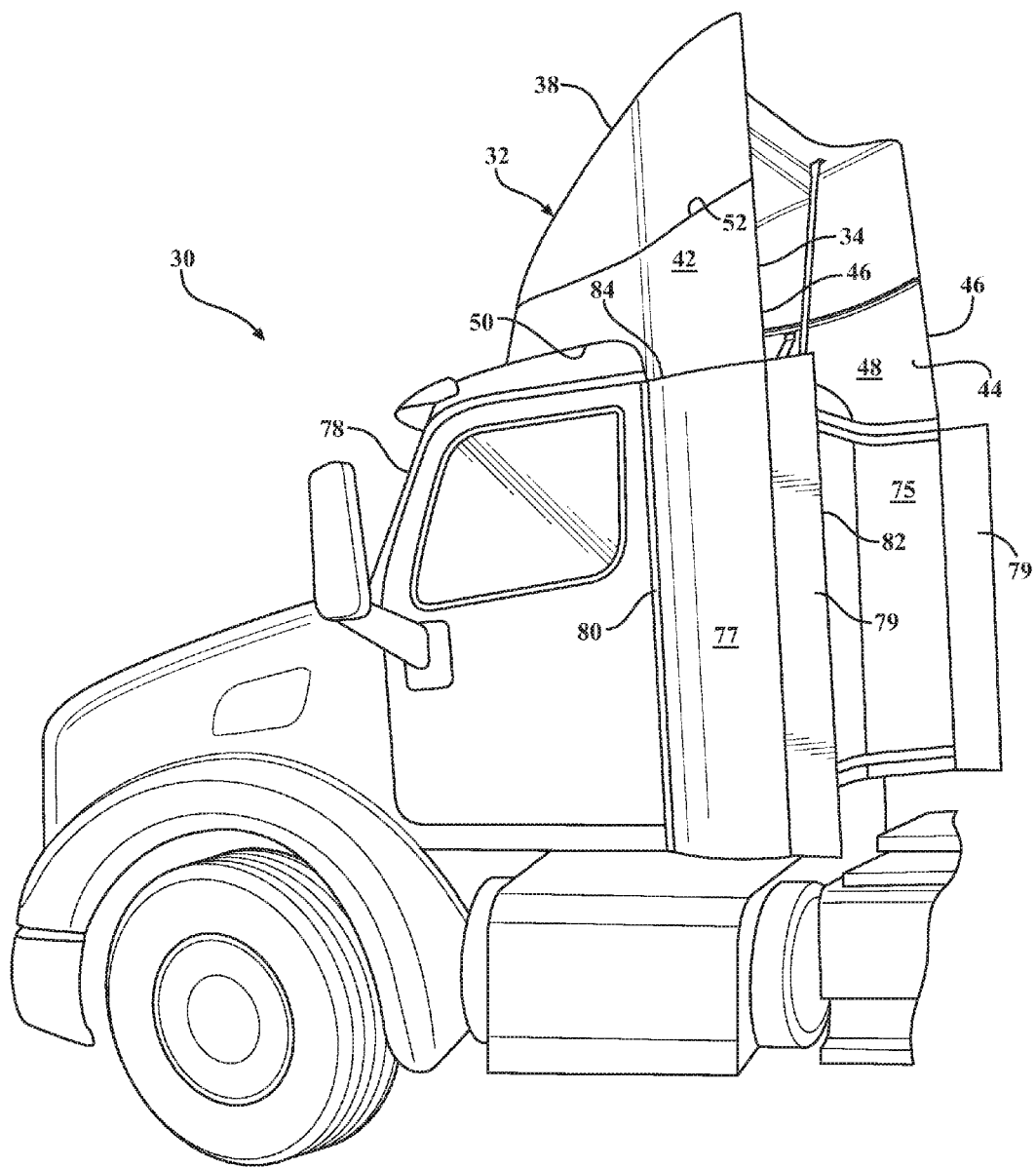
FIG. 4 is a side plan view of the roof fairing arranged in the operating position.

With reference to FIGS. 2 and 4, lower fairing 34 may be attached to cab roof 36 of truck tractor 30. Lower fairing 34 as shown has a generally C-shaped configuration when viewed from a top of lower fairing 34. A front panel 35 of lower fairing 34 faces generally forward of truck tractor 30 and may be positioned proximate a front windshield 40 of truck tractor 30. Lower fairing 34 includes a left side panel 42 and an opposite right side panel 44 (left and right as viewed from a perspective looking forward from a rear of truck tractor 30) that extend generally rearward from front panel 35. Rear edges 46 of left and right side panels 42 and 44 define an open end 48 of lower fairing 34 that is positioned rearward of front panel 35. Open end 48 of lower fairing 34 opens toward a rear of truck tractor 30.

Figure 5:
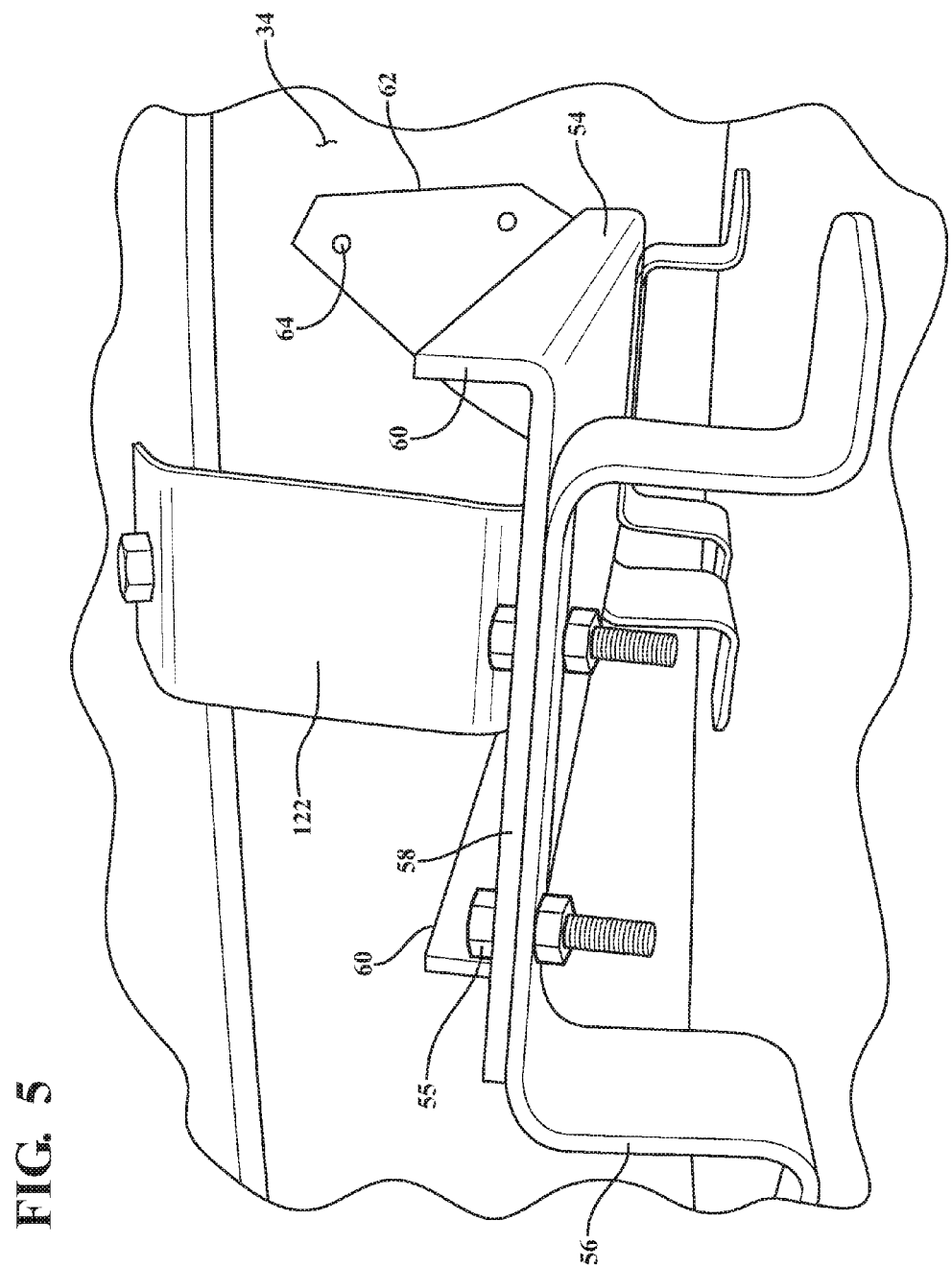
FIG. 5 is a rear view of a channel bracket attaching the roof fairing to a roof of the truck tractor.
Figure 6:
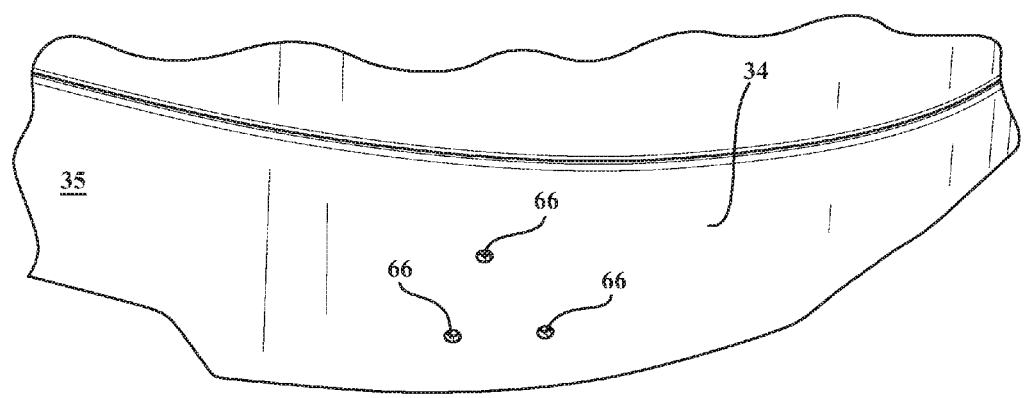
FIG. 6 is a front outside view of the roof fairing showing apertures for attaching a lower fairing to the channel bracket of FIG. 5.

With reference to FIGS. 4-6, a lower edge 50 of lower fairing 34 is positioned adjacent cab roof 36. An opposite upper edge 52 adjoins upper fairing 38. Lower fairing 34 may be secured to cab roof 36 using one or more channel brackets 54. A typical installation may employ two channel brackets 54 positioned along opposite sides of the truck tractor 30. Each channel bracket 54 may be attached to one or more cab roof mounting brackets 56 that may be installed by the original equipment manufacturer (OEM) of truck tractor 30 or by an after-market shop. One or more fasteners 55, such as a bolt or screw, may be used to attach channel bracket 54 to roof mounting bracket 56.

Channel bracket 54 may include a generally or substantially flat center section 58 that attaches to cab roof mounting brackets 56. Channel bracket 54 may also include one or more reinforcing flanges 60 located along a peripheral edge of center section 58 and extending generally perpendicular to center section 58. The orientation of channel bracket 54 along cab roof 36 is generally dependent on the location of cab roof mounting brackets 56, but may be oriented generally lengthwise along cab roof 36 (i.e., generally front to rear). Other orientations may also be employed depending on the location of cab roof mounting brackets 56 in a particular application.

Extending from an end of the channel bracket 54 is a connecting flange 62 for attaching lower fairing 34 to channel bracket 54. Connecting flange 62 may include one or more apertures 64 for receiving a fastener for securing lower fairing 34 to the connecting flange 62. Apertures 64 align with corresponding apertures 66 in lower fairing 34. Various fasteners types, for example, bolts, screws and rivets, may be used to attach lower fairing 34 to channel bracket 54.

With reference to FIGS. 3, 4, 7, and 8, certain configurations of truck tractor 30 may include a cab extender 76 for improving the aerodynamics of the vehicle. Cab extender 76 includes a left cab extender 77 arranged on the left side of truck tractor 30 and a right cab extender arranged on a right side of truck tractor 30. Cab extender 76 extends generally rearward of cab 78 of truck tractor 30 and may include a leading edge 80 positioned proximate a rear of cab 78 and an opposite trailing edge 82 positioned proximate a trailer attached to truck tractor 30. An upper edge 84 of cab extender 76 may be aligned horizontally proximate cab roof 36. Lower fairing 34 may be attached to upper edge 84 of cab extender 76. For certain applications cab extender 76 may include a generally flexible cab extender flap 79 attached to trailing edge 82 of cab extender 76.

Figure 7:
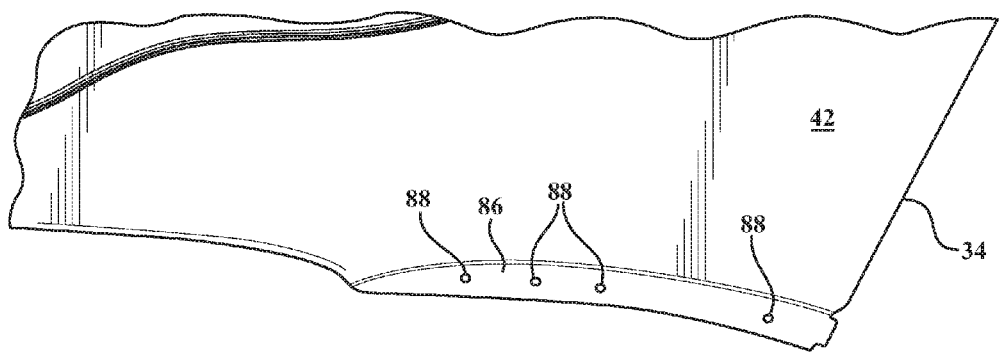
FIG. 7 is a rear inside view of a flange on the lower fairing for attaching the roof fairing to a cab extender extending from a rear portion of a cab of the truck tractor.

With reference to FIG. 7, lower fairing 34 includes a right lower flange 86 extending generally inward from right side panel 44. Right lower flange 86 may include one or more apertures 88 that coincide with corresponding apertures in a right cab extender flange that extends generally inward from upper edge 84 of the right cab extender 75. Apertures 88 may be configured to receive a suitable fastener, for example a bolt, for connecting lower fairing 34 to cab extender 76, when present.

Figure 8:
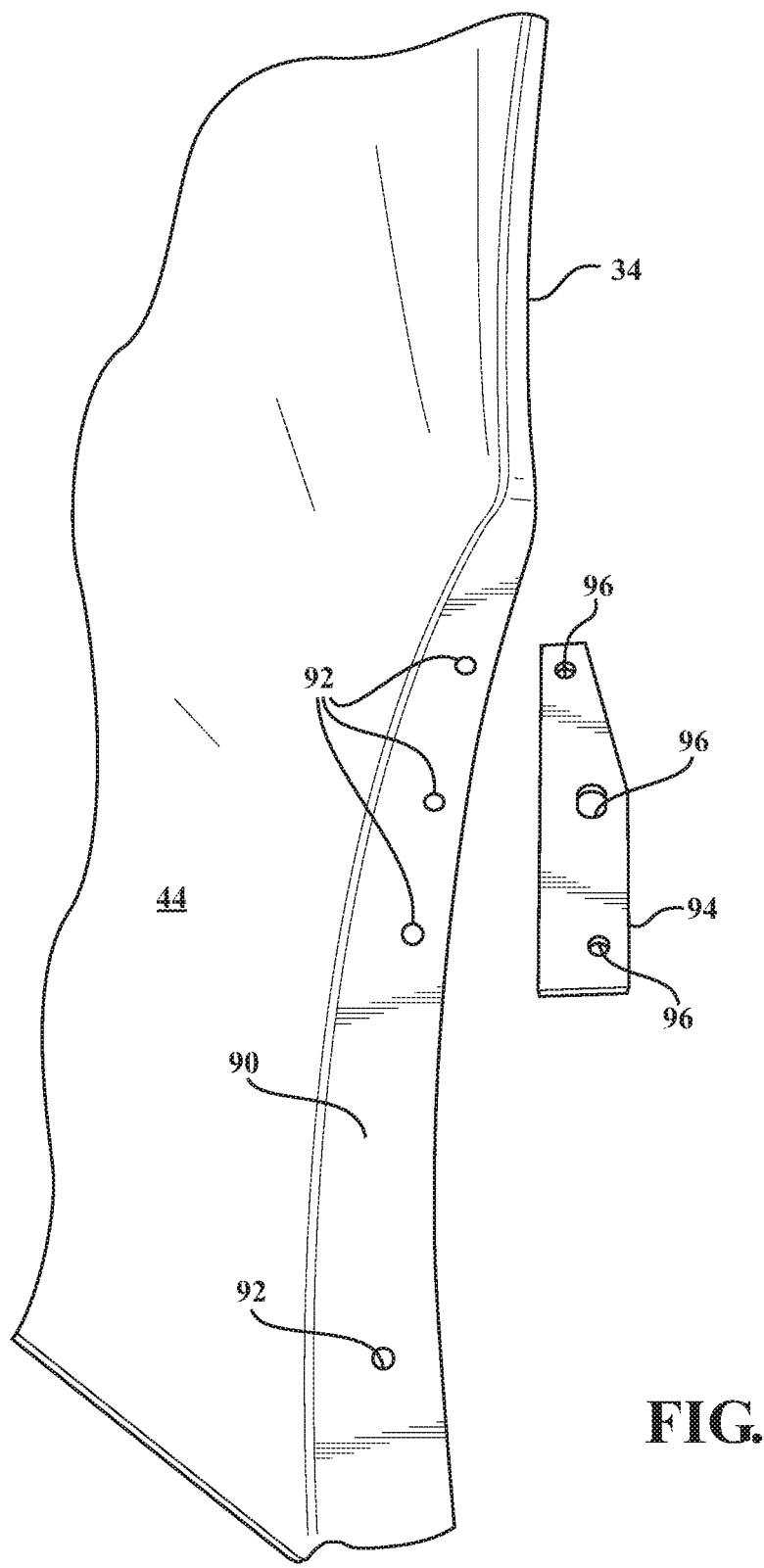
FIG. 8 illustrates a support plate for reinforcing the connection between the lower fairing and the cab extender.

With reference to FIG. 8, lower fairing 34 includes a left lower flange 90 extending generally inward from left side panel 42. Left lower flange 90 may include one or more apertures 92 that coincide with corresponding apertures in a left cab extender flange extending generally inward from upper edge 84 of left cab extender 77. Apertures 92 are configured to receive a suitable fastener, for example a bolt, for connecting lower fairing 34 to cab extender 76, when present.

With continued reference to FIG. 8, a support plate may 94 be may be employed to increase rigidity and provide support for the flanges on cab extender 76 to which lower fairing 34 is attached. Similarly configured support plates 94 may be used to support the connection between lower fairing 34 and the right side cab extender and the connection between lower fairing 34 and left cab extender 77. Apertures 96 extending through support plate 94 align with the corresponding apertures in the cab extender flange and right lower flange 86 and left lower flange 90 of lower fairing 34. Support plate 94 may be arranged along an underside of the cab extender flange. The fasteners attaching lower fairing 34 to cab extender 76 also pass through apertures 96 in support plate 94. It should be noted that support plate 94 is shown positioned upside down in FIG. 8, but the particular shape and orientation can vary.

Figure 9:
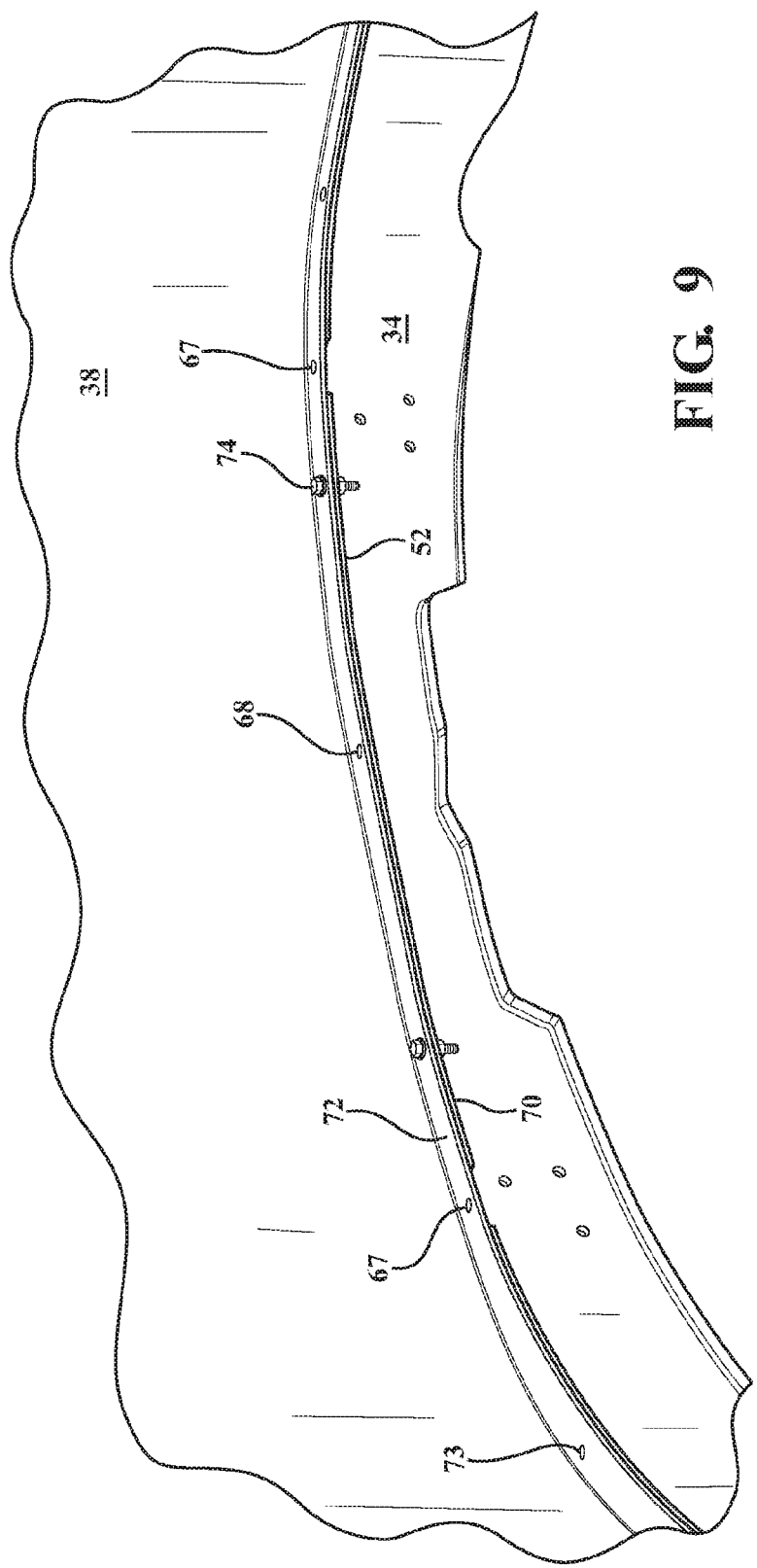
FIG. 9 is a rear inside view of the roof fairing illustrating a connection between the lower fairing and an upper fairing.

With reference to FIG. 9, upper fairing 38 includes a lower edge 68 that adjoins upper edge 52 of lower fairing 34 when upper fairing 38 is arranged in the operating position (see also FIG. 2). Lower fairing 34 may include a lower fairing flange 70 extending generally inward from upper edge 52 of lower fairing 34. Lower fairing flange 70 adjoins a corresponding upper fairing flange 72 extending generally inward from lower edge 68 of upper fairing 38. The fairing flanges 70 and 72 provide a mechanism for attaching upper fairing 38 to lower fairing 34. Upper fairing flange 72 may extend along an entire length of upper edge 52 of lower fairing 34 and lower fairing flange 70 may extend along an entire length of lower edge 68 of upper fairing 38. Alternatively, lower and upper fairing flanges 70 and 72 may only extend along a portion of their respective edges 52 and 68 of the upper and lower fairings 34 and 38. Each of the flanges 70 and 72 includes co-aligned apertures 73, at least some of which are for receiving fasteners 74 to secure the upper fairing 38 in the operating position. Various fastener types, such as bolts, screws and rivets, may be used to connect upper fairing 38 to lower fairing 34.

Figure 10:
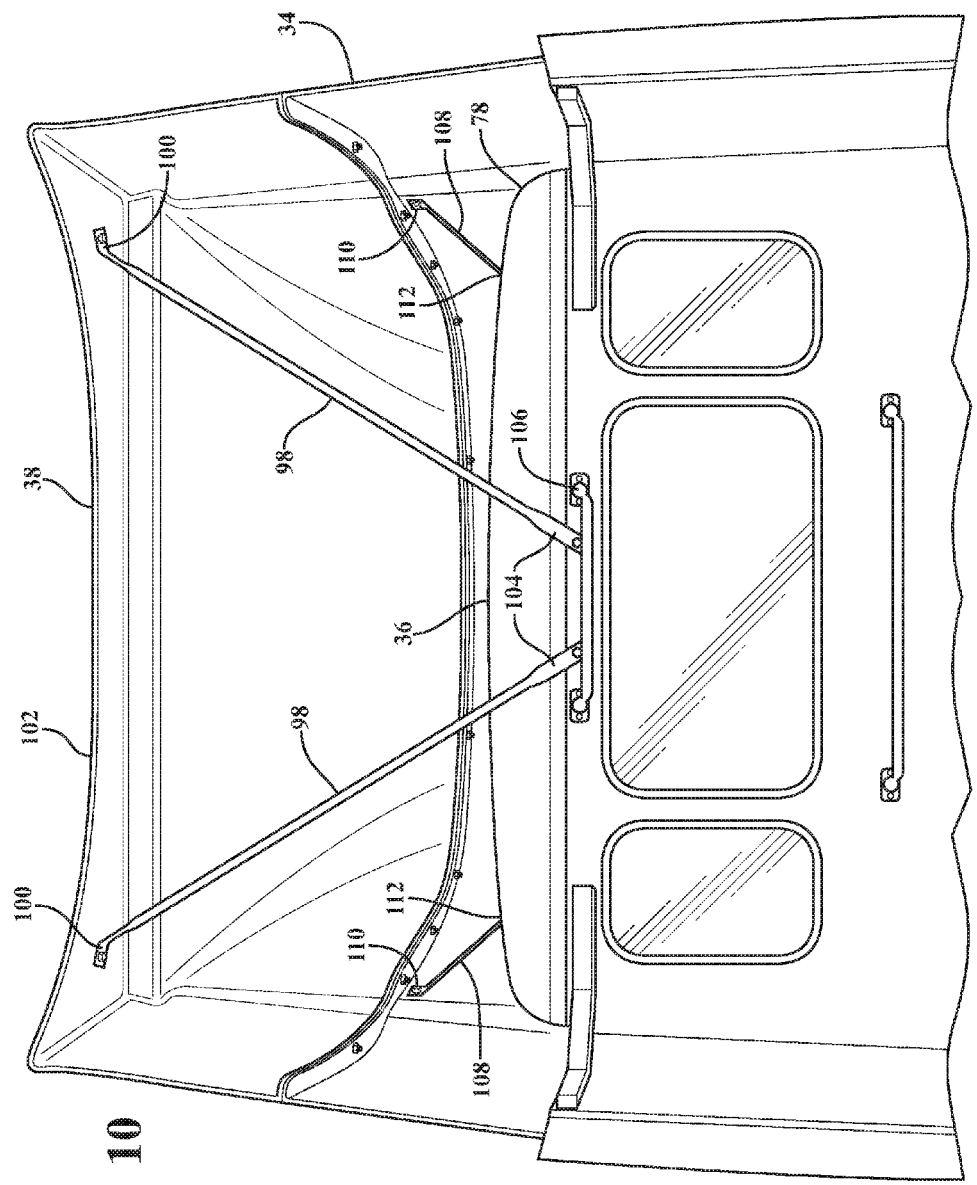
FIG. 10 is a rear plan view of the roof fairing arranged in the operating position.

With reference to FIG. 10, one of more rear support brackets 98 may be employed to provide support for upper fairing 38. The rear support brackets 98 are referred to as tubes 98 in this example, but this is not necessary. The rear support brackets 98 may be steel or channel. Two rear support tubes 98 are used in the exemplary configuration illustrated in FIG. 10, but in practice fewer of more rear support tubes 98 may be employed. Each rear support tube 98 may include a first end 100 attached proximate an upper edge 102 of upper fairing 38 and a second end 104 attached to a bracket 106 on cab 78, thereby being attached to the roof of the vehicle. Thus, each rear support tube 98 has a length sufficient for these attachments.

With continued reference to FIG. 10, one of more side support brackets 108 may be employed to provide support for lower fairing 34. The side support brackets 108 are referred to as tubes 108 in this example, but this is not necessary. The side support brackets 108 may be steel or channel. Two side support tubes 108 are used in the exemplary configuration illustrated in FIG. 10, but in practice fewer of more side support tubes 108 may be employed. Each side support tube 108 has a length sufficient for a first end 110 to attach to lower fairing 34 and a second end 112 to attach to cab roof 36.

Figure 11:
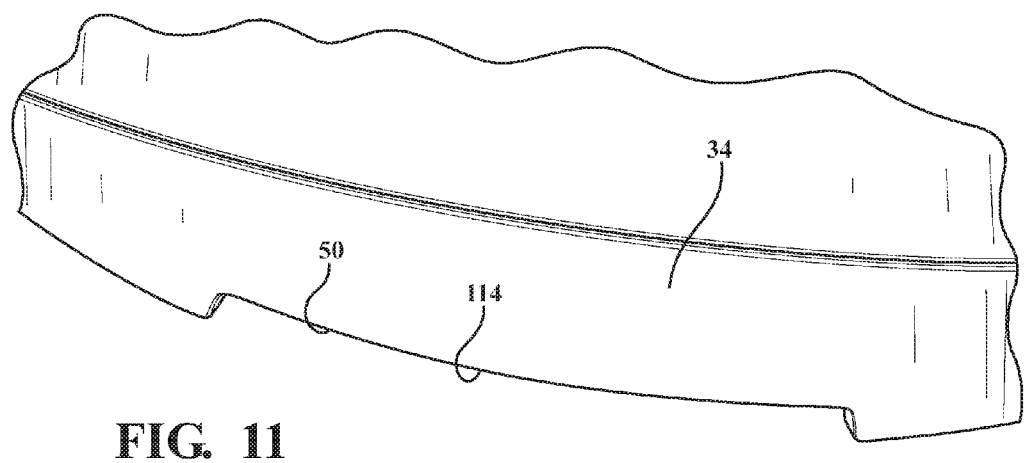
FIG. 11 is front outside view of the lower fairing showing a recessed region that provides clearance for running lights mounted to a roof of the truck tractor.
Figure 12:
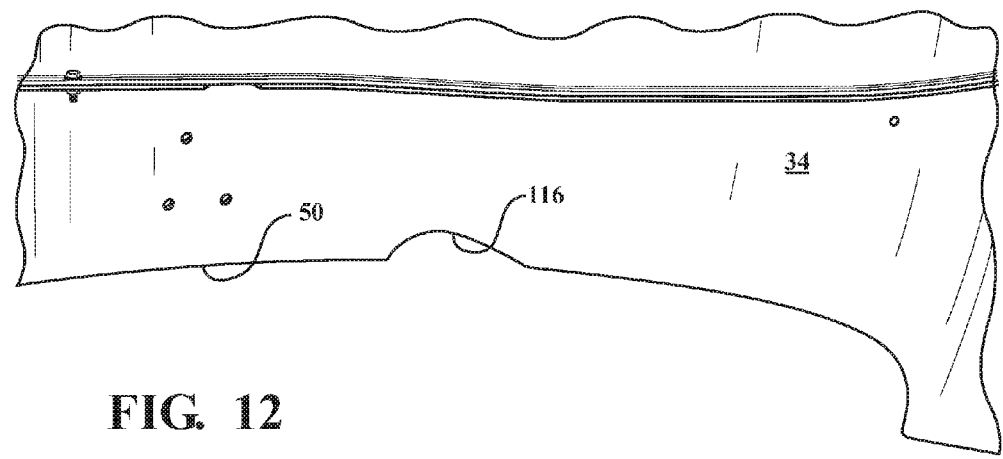
FIG. 12 is a rear inside view of the lower fairing body section showing a recessed region that provides clearance for a running light attached to the roof of the tractor trailer.

With reference to FIGS. 11 and 12, lower fairing 34 may include one or more recessed regions located along lower edge 50 to provide clearance for various features protruding from cab roof 36. For example, lower fairing 34 may include a center recessed region 114 and a side recessed region 116 that provide clearance for running lights (see, for example, FIG. 2) positioned on cab roof 36. Alternatively, lower fairing 34 may include apertures for mounting the vehicle running lights directly to lower fairing 34, thereby potentially eliminating the need for either or both recessed regions 114 and 116.

Figure 13:
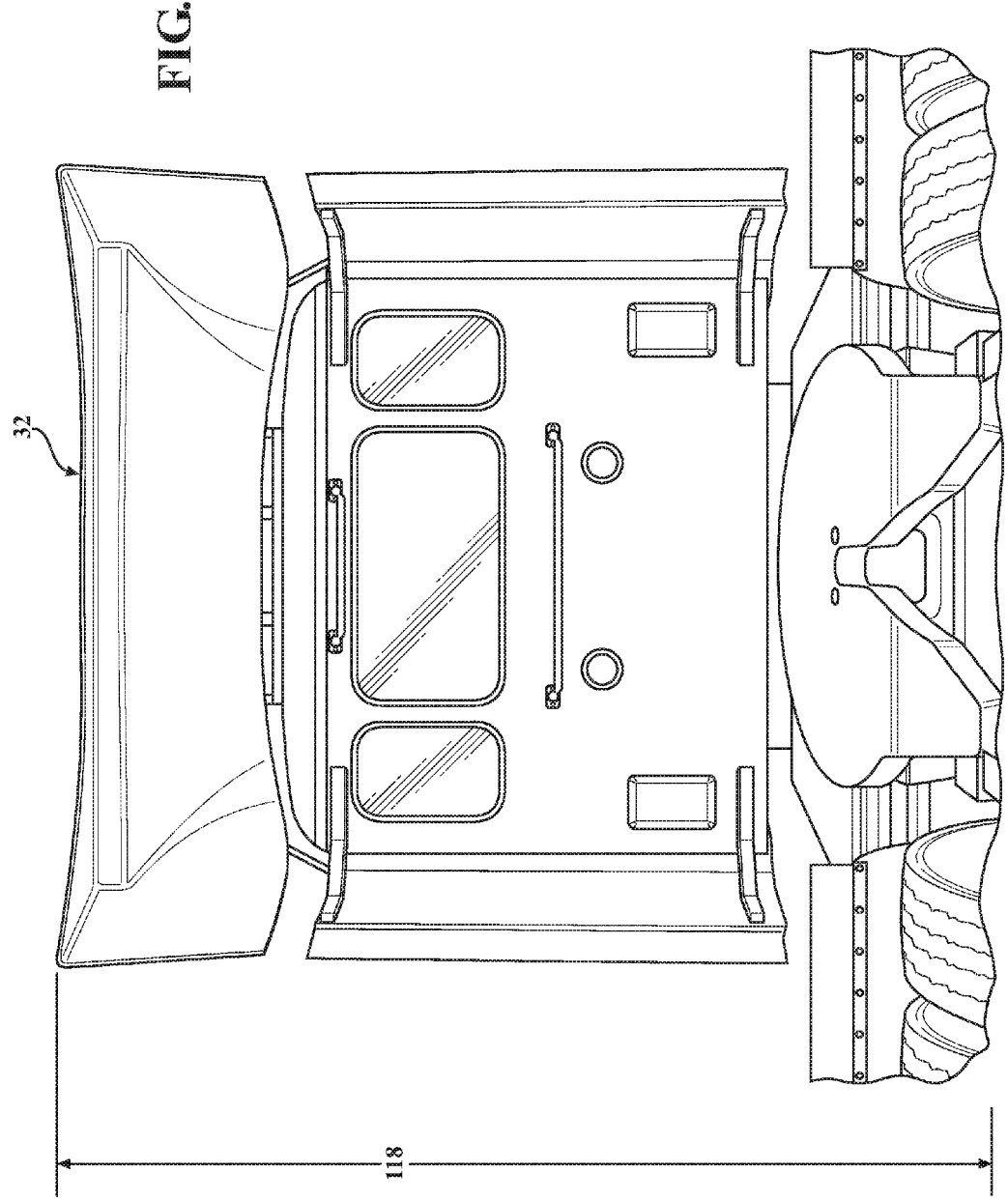
FIG. 13 is a rear plan view of the truck tractor with the roof fairing arranged in the collapsed position.

Upper fairing 38 may be selectively moved from the operating position, as shown for example in FIG. 2, to a collapsed position, as shown for example in FIG. 3. FIG. 13 is a rear view of truck tractor 30 with the roof fairing 32 arranged in the collapsed position. Positioning roof fairing 32 in the collapsed position reduces an overall height 118 (see FIG. 1) of the truck tractor 30 with the roof fairing 32. This may be particularly advantageous when placing truck tractor 30 in a decked arrangement for shipping to provide sufficient clearance between roof fairing 32 and overhead obstacles, such as a bridge overpass.

Figure 14:
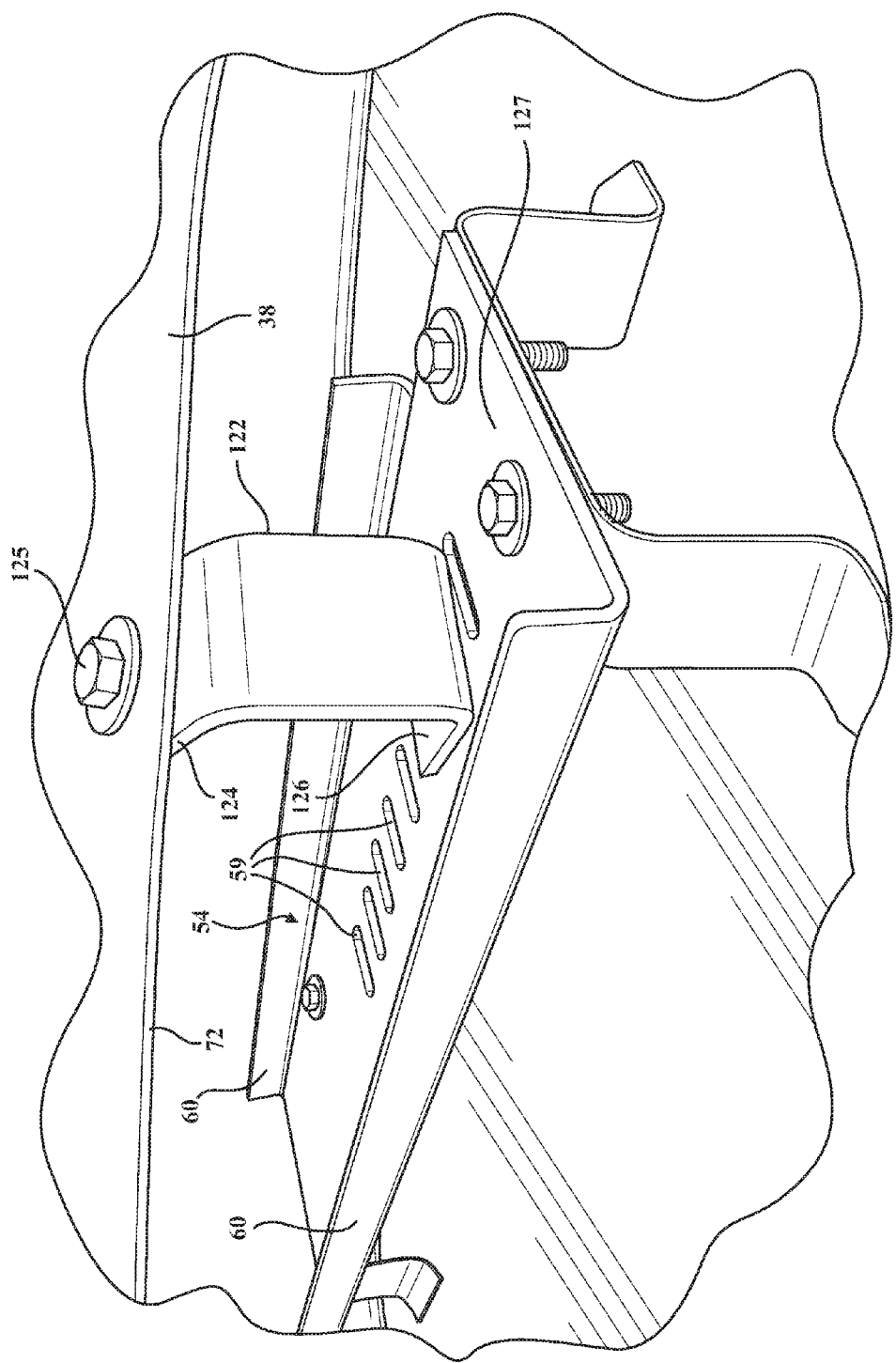
FIG. 14 is a rear inside view of the roof fairing illustrating a front decking bracket connecting the upper fairing to the channel bracket of FIG. 5 when the roof fairing is arranged in the collapsed position.

Upper fairing 38 may be completely separated from lower fairing 34 and secured to cab 78 when arranged in the collapsed position. Upper fairing 38 is nested within lower fairing 34 when roof fairing 32 is in the collapsed position. With reference to FIG. 14, when arranged in the collapsed position a front portion 120 of upper fairing 38 (see FIG. 2) may be attached to channel bracket 54 using a front decking bracket 122.

Front decking bracket 122 is illustrated as having a generally C-shaped configuration, but may also have a different configuration depending on the particular application. One or more front decking brackets 122 may be used. The total number of front decking brackets 122 may generally correspond to the number of channel brackets 54 employed, with one decking bracket 122 for each channel bracket employed. An end 124 of front decking bracket 122 may be fastened to upper fairing flange 72 using fastener 125. Front decking bracket 122 may remain attached to upper fairing flange 72 when upper fairing 38 is arranged in the collapsed position and the operating position.

With upper fairing 38 arranged in the collapsed position, an end 126 of front decking bracket 122 that is opposite end 124 may be attached to channel bracket 54. Various fastener types may be used for attaching front decking bracket 122 to channel bracket 54. Front decking bracket 122 may be secured proximate an end 127 of channel bracket 54 opposite connecting flange 62 in this example (see also FIG. 5). As can be seen in FIG. 14, the center section 58 has a number of apertures 59 extending along its length for the connection with the front decking bracket 122. The apertures 59 are shown as slots extending between the reinforcing flanges 60 that are arranged in parallel with one another. This arrangement is not required. However, it provides benefits in that the front decking bracket 122 can be affixed to slots closer or further away from the end 127 to adjust for variations in the height of the upper fairing 38, the height of the lower fairing 34, and/or the height 118 when arranged for transportation (e.g., as compared to a maximum clearance height for the transportation path for the truck tractor 30.

Figure 15:
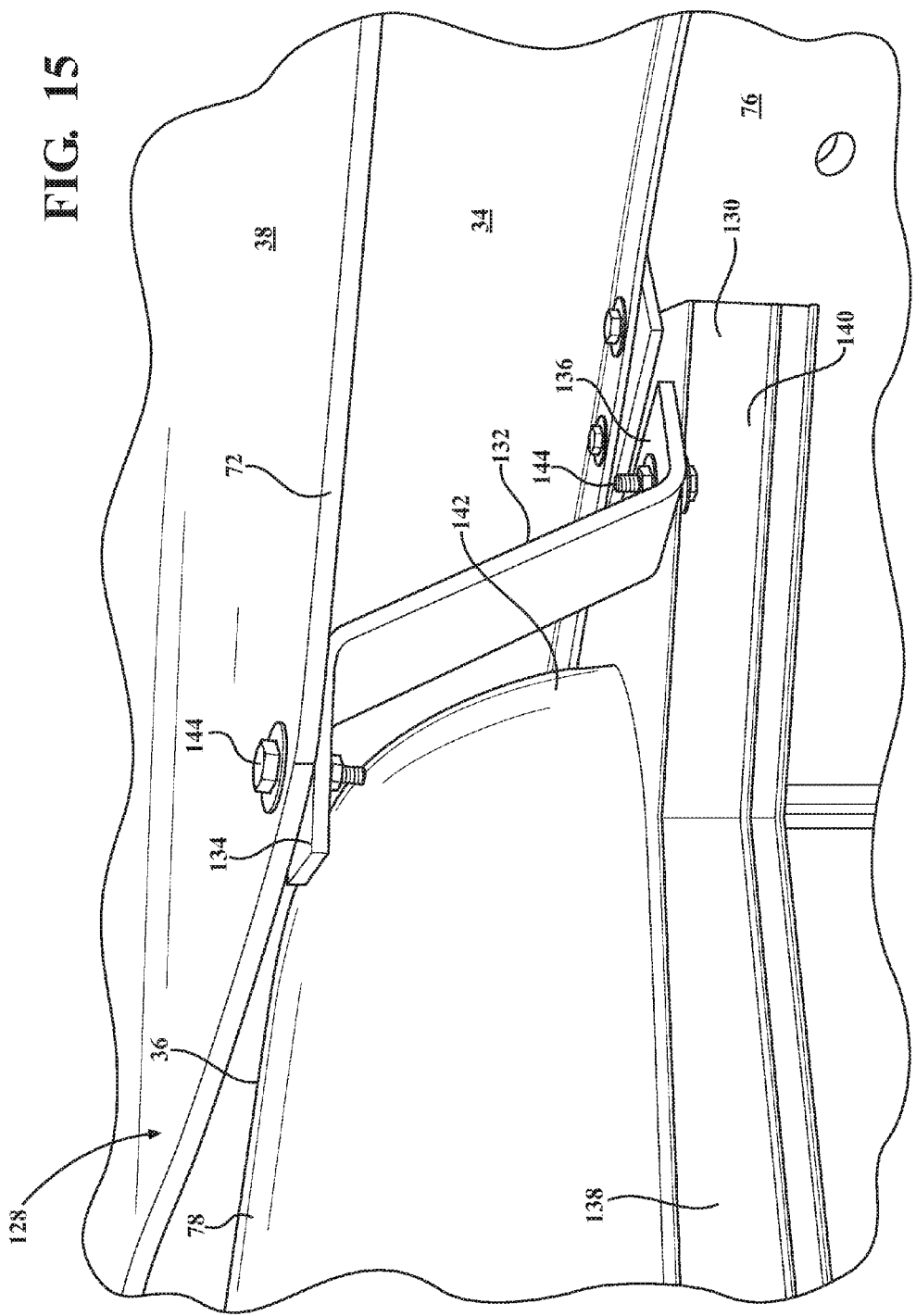
FIG. 15 is a rear inside view of the roof fairing illustrating a rear decking bracket connecting the upper fairing to a cab support bracket when the roof fairing is arranged in the collapsed position.
Figure 16:
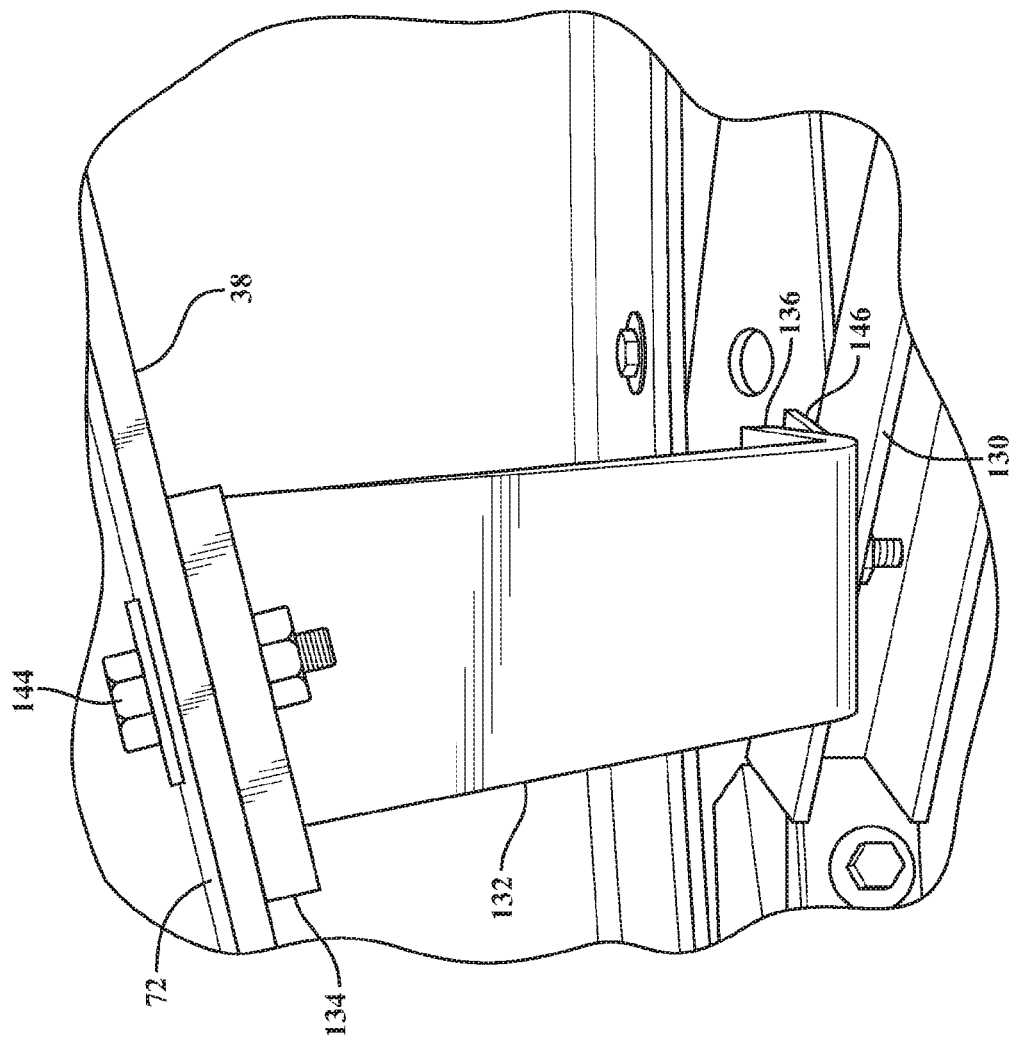
FIG. 16 is an alternate rear inside view of the roof fairing illustrating the rear decking bracket connecting the upper fairing to the cab support bracket when the roof fairing is arranged in the collapsed position.
Figure 17:
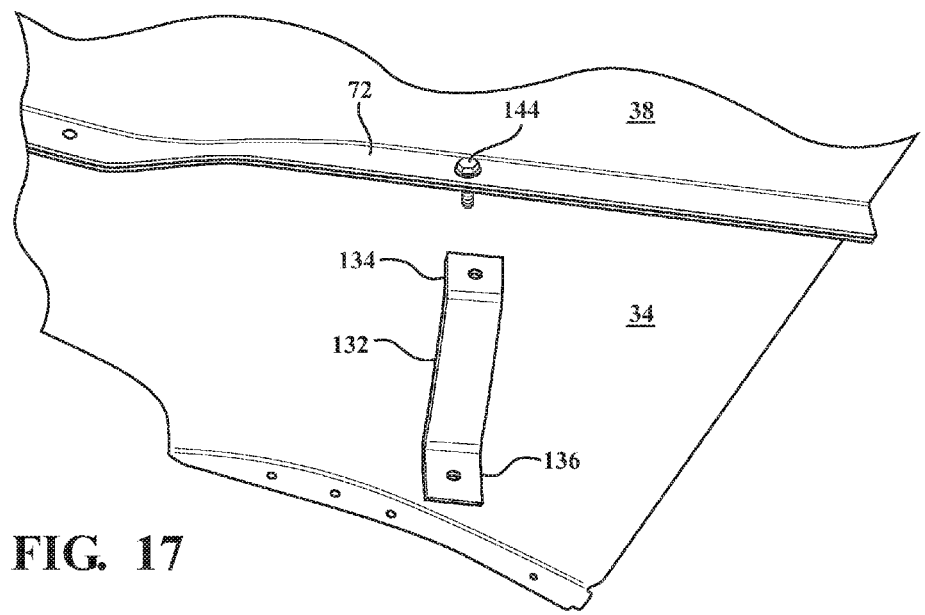
FIG. 17 is a rear inside view of the roof fairing illustrating a location of the rear decking bracket relative to the upper fairing.

With reference to FIGS. 15-17, a rear portion 128 of upper fairing 38 is attached to a cab extender bracket 130 when arranged in the collapsed position. Cab extender bracket 130 may be a truck OEM cab extender bracket and, as shown, includes an end 138 attached to a rear 142 of cab 78 in a general vicinity of cab roof 36, and an opposite end 140 attached to cab extender 76. Cab extender bracket 130 may provide support for cab extender 76. A rear decking bracket 132 may have one end 134 attached to upper fairing flange 72 along a right side of upper fairing 38 and an opposite end 136 attached to cab extender bracket 130 located along a right side of cab 78. FIG. 17 illustrates a position of rear decking bracket 132 along upper fairing flange 72. A second rear decking bracket 132 may have end 134 attached to upper fairing flange 72 along a left side of upper fairing 38 and an opposite end 136 attached to cab extender bracket 130 located along a left side of cab 78. A fastener 144, such as bolt or screw, may be used to attach rear decking bracket 132 to upper fairing 38 and cab extender bracket 130. An insulator 146 may be positioned between rear decking bracket 132 and cab extender bracket 130 to provide vibration damping and prevent rear decking bracket 132 from potentially damaging the finish of cab extender bracket 130 (see FIG. 16).

Upper fairing 38 may be selectively moved from the upright position by detaching fasteners 74 (see FIG. 9) and removing the rear support tubes 98 (see FIG. 10) to separate upper fairing 38 from lower fairing 34. Upper fairing 38 may then be positioned in the nested collapsed position, as illustrated for example in FIG. 3. Upper fairing 38 may be secured in the collapsed position by attaching front decking bracket 122 to channel bracket 54 and attaching rear portion 128 of upper fairing 38 to cab extender bracket 130 using rear decking bracket 132.

The upper fairing 38 may be moved to the operating position from the collapsed position by detaching front decking bracket 122 from channel bracket 54 and upper fairing 38 from rear decking bracket 132. Upper fairing 38 may then be position on lower fairing 34 by engaging lower edge 68 of upper fairing 38 with upper edge 52 of lower fairing 34. Front decking bracket 122 may assist in aligning upper fairing 38 with lower fairing 34 by operating as a stop to prevent upper fairing 38 from being slid to far forward relative to lower fairing 34, as illustrated for example in FIG. 18. Upper fairing 38 may be secured to lower fairing 34 using fasteners 74. Rear support tubes 98 may be attached to upper fairing 38 and bracket 106 on cab 78.

Figure 18:
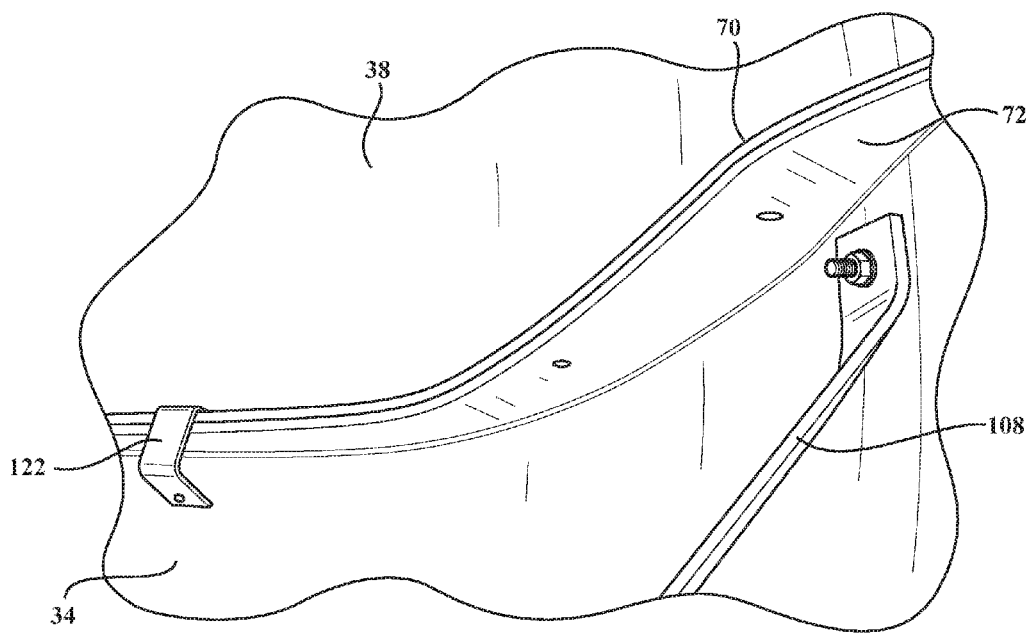
FIG. 18 is rear inside review of the roof fairing illustrating the position of the front decking bracket of FIG. 14 when the roof fairing is arranged in the operating position.

As shown in FIG. 9, but omitted from FIG. 18 for clarity, the lower fairing flange 70 may have a reduced rearward length at an area where front decking bracket 122 is attached to the upper fairing flange 72. This allows the front decking bracket 122 (two in the configuration of FIG. 9) to extend through a respective aperture 67 of the upper fairing flange 72 without being attached to lower fairing flange 70. If desired, this allows the front decking bracket 122 to be installed once and left in place whether the upper fairing is in the operating position or the collapsed position.

It is intended that the scope of the present methods and apparatuses be defined by the following claims. However, it must be understood that the various disclosed configurations and operation of the collapsible roof fairing may be practiced otherwise than is specifically explained and illustrated without departing from its spirit or scope. It should be understood by those skilled in the art that various alternatives to the configurations described herein may be employed in practicing the claims without departing from the scope as defined in the following claims. The scope of the disclosed systems and methods should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. Furthermore, all terms used in the claims are intended to be given their broadest reasonable constructions and their ordinary meanings as understood by those skilled in the art unless an explicit indication to the contrary is made herein. In particular, use of the singular articles such as "a," "the," "said," etc., should be read to recite one or more of the indicated elements unless a claim recites an explicit limitation to the contrary. It is intended that the following claims define the scope of the device and that the method and apparatus within the scope of these claims and their equivalents be covered thereby. In sum, it should be understood that the device is capable of modification and variation and is limited only by the following claims.

What is claimed is:

1. A roof fairing for a vehicle, the roof fairing comprising:
    a channel bracket attachable to a roof of the vehicle;
    a lower fairing connected to the channel bracket;
    an upper fairing removably connected to the lower fairing, the upper fairing selectively moveable between an operating position and a collapsed position; and
    a front decking bracket attached to the upper fairing, the front decking bracket connectable to the channel bracket when the upper fairing is arranged in the collapsed position, and detached from the channel bracket when the upper fairing is arranged in the operating position.

2. The roof fairing of claim 1, wherein the channel bracket comprises:
    a center section attachable to a mounting bracket of the roof, the center section being substantially flat; and
    one or more reinforcing flanges located along a peripheral edge of the center section, and extending generally perpendicularly therefrom.

3. The roof fairing of claim 1, further comprising:
    a connecting flange that attaches the lower fairing to the channel bracket, the connecting flange extending from one end of the channel bracket and having apertures that align with apertures of the lower fairing.

4. The roof fairing of claim 1, wherein the lower fairing comprises a generally C-shape when viewed from a top of the lower fairing formed of a right side panel, a left side panel, and a front panel, a right lower flange extending generally inward from the right side panel with apertures alignable with first apertures a cab extender of the vehicle, and a left lower flange extending generally inward from the left side panel with apertures alignable with second apertures of the cab extender.

5. The roof fairing of claim 1, wherein the lower fairing comprises a generally C-shape when viewed from a top of the lower fairing, a lower edge, and at least one flange extending generally inward from the lower edge with apertures alignable with apertures of a cab extender of the vehicle.

6. The roof fairing of claim 5, further comprising:
    a support plate that is substantially flat and has apertures alignable with at least some of the apertures of the cab extender and at least some of the apertures of the at least one flange.

7. The roof fairing of claim 1, wherein the lower fairing comprises a first flange extending rearwardly along an upper edge and having first apertures extending through the first flange, the upper fairing comprises a second flange extending rearwardly along a lower edge and having second apertures extending through the second flange, at least some of the first apertures aligned with at least some of the second apertures when the upper fairing is in the operating position.

8. The roof fairing of claim 7, wherein the front decking bracket is attached to the second flange of the upper fairing.

9. The roof fairing of claim 8, wherein the first flange extends along substantially an entire length of the upper edge and has a reduced rearward length at an area where the front decking bracket is attached to the second flange.

10. The roof fairing of claim 1, further comprising:
    a rear support bracket having a length sufficient for a first end to attach to an upper edge of the upper fairing and a second end to attach to the roof of the vehicle.

11. The roof fairing of claim 1, further comprising:
    a side support bracket having a length sufficient for a first end to attach to the lower fairing and a second end to attach to the roof of the vehicle.

12. The roof fairing of claim 1, wherein the front decking bracket comprises a first end attached to a lower flange extending along a lower edge of the upper fairing in the operating position and in the collapsed position, and a second end attached to the channel bracket only when the upper fairing is arranged in the collapsed position.

13. The roof fairing of claim 12, wherein the channel bracket comprises a plurality of slots extending in parallel with each other along a length of the channel bracket, for connection of the second end to the channel bracket.

14. The roof fairing of claim 1, further comprising:
    a rear decking bracket having a first end attachable to a flange of the upper fairing and an opposite end attachable to the vehicle.

15. A method of installing a roof fairing on a vehicle, the method comprising:
- detaching a front decking bracket from a channel bracket attached to a roof of the vehicle, the front decking bracket attached to an upper fairing arranged in a collapsed position, and a lower fairing connected to the channel bracket, the roof fairing comprising the upper fairing and the lower fairing;
- positioning the upper fairing in an operating position on the lower fairing by engaging a lower edge of the upper fairing with an upper edge of the lower fairing; and
- securing the upper fairing to the lower fairing in the operating position with the front decking bracket detached from the channel bracket.

16. The method of claim 15, wherein the upper fairing is attached to the vehicle by a rear decking bracket in the collapsed position, the method further comprising:
- detaching the upper fairing from the rear decking bracket before positioning the upper fairing.

17. The method of claim 16, further comprising:
removing the rear decking bracket from the vehicle.

18. The method of claim 15, further comprising:
attaching one end of a rear support bracket to the upper fairing and an opposing end of the rear support bracket to the vehicle after securing the upper fairing to the lower fairing using fasteners.

19. A method of installing a roof fairing on a vehicle, the method comprising:
- attaching a channel bracket to a roof of the vehicle;
- attaching a lower fairing to the channel bracket, the roof fairing comprising the lower fairing and an upper fairing;
- attaching a front decking bracket to the upper fairing; and
- attaching the front decking bracket to the channel bracket so that the upper fairing is in a collapsed position separated from the lower fairing.

20. The method of claim 19, further comprising:
- attaching a rear decking bracket to the upper fairing; and
- securing the rear decking bracket to the vehicle when the upper fairing is in the collapsed position.

* * * * *